(12) United States Patent
Manus

(10) Patent No.: US 7,760,909 B2
(45) Date of Patent: Jul. 20, 2010

(54) VIDEO TRACKING AND REGISTERING

(75) Inventor: Johannes Manus, München (DE)

(73) Assignee: BrainLAB AG, Feldkirchen (DE)

( * ) Notice: Subject to any disclaimer, the term of this patent is extended or adjusted under 35 U.S.C. 154(b) by 1123 days.

(21) Appl. No.: 11/330,713

(22) Filed: Jan. 12, 2006

(65) Prior Publication Data

US 2006/0171560 A1    Aug. 3, 2006

Related U.S. Application Data

(60) Provisional application No. 60/645,404, filed on Jan. 19, 2005.

(30) Foreign Application Priority Data

Jan. 12, 2005    (EP) .................................. 05000467

(51) Int. Cl.
G06K 9/00    (2006.01)
A61B 5/05    (2006.01)

(52) U.S. Cl. ...................... 382/103; 382/184; 600/426

(58) Field of Classification Search ................ 382/100, 382/103, 128, 129, 130, 131, 132, 133, 168, 382/181, 190, 201, 232, 254, 276, 287, 291, 382/205, 308, 184; 600/426, 427, 407, 473; 705/2

See application file for complete search history.

(56) References Cited

U.S. PATENT DOCUMENTS 5,867,821 A * 2/1999 Ballantyne et al. ............. 705/2
6,006,126 A * 12/1999 Cosman ....................... 600/426
6,795,567 B1 * 9/2004 Cham et al. .................. 382/103
7,239,908 B1 * 7/2007 Alexander et al. ........... 600/427
2002/0002330 A1 * 1/2002 Vilsmeier .................... 600/407
2002/0099293 A1 * 7/2002 Fontenot et al. ............. 600/473
2002/0183608 A1   12/2002 Marmulla et al.

FOREIGN PATENT DOCUMENTS

EP    1 319 368 A2    6/2003

* cited by examiner

Primary Examiner—Seyed Azarian
(74) Attorney, Agent, or Firm—Renner, Otto, Boisselle & Sklar, LLP

(57) ABSTRACT

A device and a method are provided for spatially locating and tracking an object, such as medical instruments, a patient and/or part of a patient's body using a camera array having at least two cameras, and for mutually assigning the spatial position of the object and an acquired, stored data set. Trackable markings are recorded via the camera array, the markings are extracted from the recordings, and a location of the markings is monitored, wherein the spatial position of the object is based on the location of the markings. Further, video recordings of a surface of the object are produced via the camera array and, with computer assistance, surface portions of the object are identified and correlated with corresponding surface portions in the stored data set, wherein the spatial position of the object is assigned to that of the data set.

20 Claims, 3 Drawing Sheets

VIDEO TRACKING AND REGISTERING

RELATED APPLICATION DATA

This application claims priority of U.S. Provisional Application No. 60/645,404 filed on Jan. 19, 2005, which is incorporated herein by reference in its entirety.

FIELD OF THE INVENTION

The present invention relates to a tracking and registering method and to a device for spatially locating, tracking and registering an object, wherein recordings of the object can be taken via a camera array.

BACKGROUND OF THE INVENTION

Known medical navigation systems generally use a tracking system for tracking a patient's body or an instrument, wherein the tracking system includes a registration instrument, which in turn guarantees a registration process by scanning the surface of a patient. Since a number of apparatus are used for registering and tracking an object, inaccuracies can be introduced by each apparatus, and resultant calculation errors can propagate through the entire tracking process.

SUMMARY OF THE INVENTION

A tracking and registering method is provided for spatially locating and tracking an object, such as medical instruments, a patient and/or part of a patient's body, using a camera array that can include at least two cameras. Further, the method enables mutual assignment of the spatial position of the object (which can be known or ascertained) and an acquired, stored data set, such as a patient data set (which can be or has been ascertained by means of an imaging method). An x-ray method, a nuclear spin method, a computer tomography method, an ultrasound method, a positron emission tomography (PET) method or a single photon emission tomography (SPECT) method, for example, can be used as the imaging method for ascertaining the data set. Tracking markings (also referred to as trackable markings) such as markers or reference stars, which can be attached on the object, can be recorded using the camera array, in particular using the at least two cameras. The markers or reference stars can be active markers that, for example, emit infrared radiation or visible light, or passive markers that, for example, reflect infrared radiation or visible light. The recorded tracking markings can be extracted from the camera recordings and tracked, in order to locate and track the object or to guarantee that the object is located and tracked. The distance or position (e.g., the initial position) of the tracking markings (which can be attached on the object) with respect to the camera array can be known, established or ascertained by means of a calibration process, for example, such that the spatial position of the tracking markings can be known or ascertained by being detected by the camera array, or changes in position of the tracking markings can be detected and tracked by the camera array.

From these or other video recordings of the surface of the object, which can be taken by means of the same camera array, surface portions can be identified, such as natural or artificial (e.g., artificially attached) landmarks that, with computer assistance, can be correlated with corresponding surface portions in the stored data set, in order to assign the spatial position of the object and that of the data set. The recordings can be taken simultaneously via the at least two cameras, which can be calibrated with respect to a common coordinate system such as the tracking system's coordinate system. In particular, the recordings, which can be taken from different camera locations or positions, can be used for a registration process. The registration process can be performed by identifying the surface portions in the video recordings that may be correlated with the corresponding surface portions in the stored data set, in order to achieve a registration.

Since the video recordings can be previously recorded from a known position relative to the coordinate system, such as, for example, the origin of the tracking system's coordinate system or the camera's coordinate system, additional location information on the camera array or the at least two cameras is not necessary for the registration process.

Preferably, the distance between the at least two cameras of the camera array is known or can be determined, for example, by means of a calibration process. Using the cameras, one or more images can be recorded in each case, and characteristic points or surface portions can be identified in the recordings. The spatial positions of the characteristic points, such as their positions in the global coordinate system, can be ascertained, since the position of the cameras with respect to each other or with respect to the global coordinate system, such as the tracking system's coordinate system or the camera array's coordinate system, is known or can be determined. This is advantageous as compared to systems in which camera position is tracked by a tracking system during the recording process, since the accuracy of the camera position obtained by such techniques generally is less precise than that obtained by determining the positions of the at least two cameras with respect to the camera array by means of the calibration process.

Corresponding points, point sets, tuples of points or contours of the surface can be used as surface portions of the object and can be identified in the video recordings. The identified surface portions can be correlated or registered with the corresponding surface portions of the data set, for example, by means of a computer-assisted matching method, a photo consistency method or a point correlation method. A method for registration described in WO 01/59708 A1, for example, can be used as a photo consistency method, while a method described in EP 04 027 075.3 can serve as a point correlation method for ascertaining and minimizing point correlations, in order to perform the registration process. The contents of both WO 01/59708 A1 and EP 04 027 075.3 are hereby incorporated by reference in their entirety. The surface portions of the recordings, for example, can be natural or artificial landmarks, e.g., artificially projected, plotted or attached landmark points. The surface portions also can be ascertained by means of a computer-assisted morphing method or warping method, such as described in EP 04 027 075.3, for example.

The data set, which can be acquired by means of an imaging method, and the video or camera recordings, in particular the identified surface portions, can be processed or stored in a medical navigation system to which the tracking and registration camera array is assigned. The identified surface portions and the data set, preferably the corresponding surface portions of the data set, also can be correlated in the navigation system, such as in a computer, such that the recordings can be registered in the navigation system with respect to the stored data set.

The recordings can be produced in the visible light range and/or be recorded by means of visible light, for example, for tracking and/or locating and for assigning the spatial positions of the object and that of the data set. The recordings also can be produced in the infrared range and/or by means of infrared radiation, for example, for tracking and locating, by detecting the infrared radiation of the active or passive tracking markings, while the recordings can be recorded in the visible light range for assigning the spatial positions and that of the data set.

The invention further provides a computer program which, when it is loaded onto a computer or is running on a computer, performs a method such as described above. The invention also provides a program storage medium or a computer program product comprising such a program.

A device for spatially locating, tracking and registering an object can include a single camera array having at least two cameras, from which recordings of an object (such as a patient, part of a patient's body and/or of medical instruments, to which tracking markings that can be attached and also recorded) can be obtained, in particular from different recording positions. The object can include tracking markings can be extracted from the recordings (e.g., by means of a navigation system, such as a computer to which the camera array can be connected or assigned) and tracked in order to locate and track the object. Since the spatial position of the tracking markings can be known or ascertained, spatial positions can be assigned, in particular to a coordinate system such as the tracking system's coordinate system, such that changes in the position of the object can be detected by the camera array and recognized or displayed by the tracking system. The at least two cameras of the camera array also can produce video recordings of the surface of the object. From the recordings, surface portions can be identified, for example, by means of a navigation system, and correlated, with computer assistance, with corresponding surface portions in the stored data set, to assign the spatial position of the object and that of the data set, or to perform a registration process. Since the at least two cameras can be connected to the tracking system and the spatial position of the object with respect to the camera or camera array can be known or ascertained, the recordings can be in a known relation to the coordinate system, such as the tracking system's coordinate system. Additional location information on the camera array or the at least two cameras (e.g., obtaining location information by tracking the camera array) is not necessary for registration, as the information obtained by means of the calibration process can be sufficient.

The at least two cameras of the camera array can be configured for video recordings in the visible light range, such that they can record objects that emit or reflect visible light, such as the patient or part of the patient's body and the medical instruments. The at least two cameras also can be configured as hybrid cameras that can take video recordings in both the visible light range and the infrared range, in order to detect tracking markings that emit or reflect infrared radiation, such as markers or reference stars.

The camera array can be configured to be fixed or movable, in order to obtain the recordings of the object.

The device also can include an input device such as a keyboard, an x-ray device, an ultrasound tomograph, a magnetic resonance tomograph, a computer tomograph, a positron emission tomograph or a large SPECT tomograph. Using these devices, the object (e.g., the body or part of a patient's body or a medical instrument) can be detected before or during an operation and can be read into the navigation system as a reference data set (e.g., a patient data set), with respect to which the registration process can be performed. Furthermore, the device can include a database for storage and retrieval of the detected data. The navigation system, for example, can access the database and select a desired data set as a reference data set for registration. The device also can include a data output device such as a screen (e.g., a monitor or display device), on which the registering process, tracking process and/or navigation process can be graphically displayed, to enable an instrument to be navigated with respect to the body to be examined.

The forgoing and other embodiments of the invention are hereinafter discussed with reference to the drawings.

DETAILED DESCRIPTION

Figure 1:
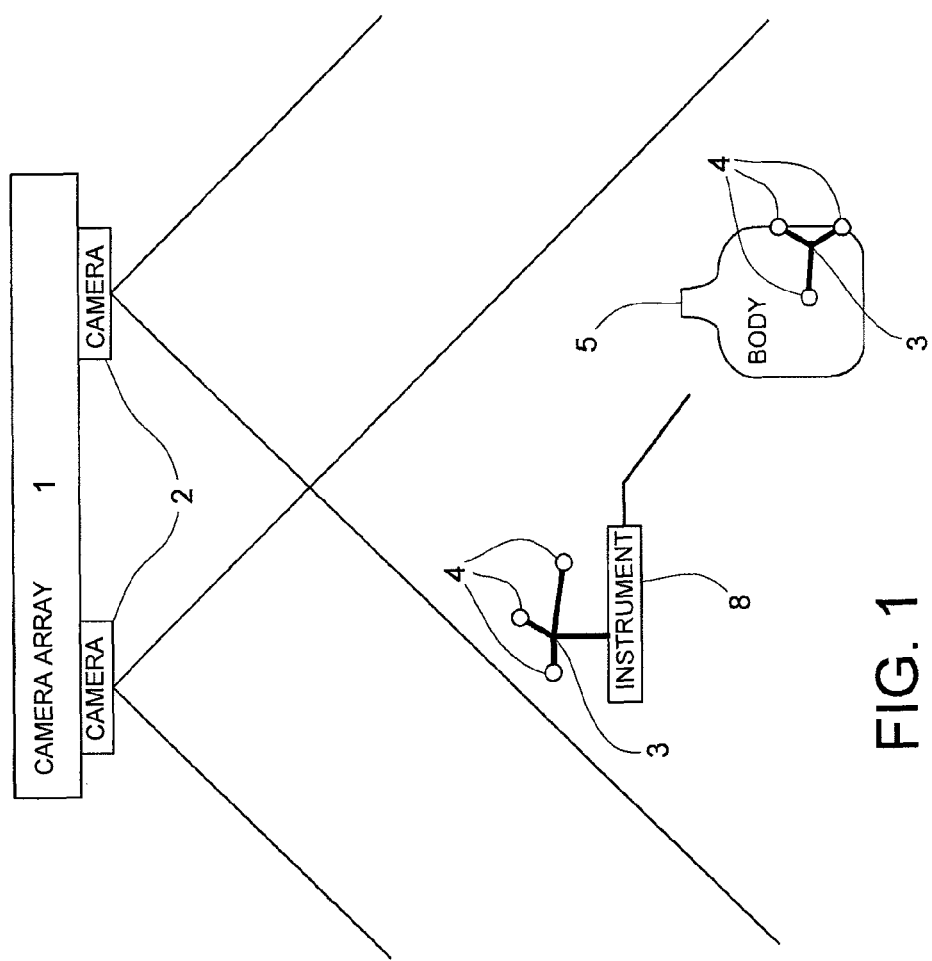
FIG. 1 illustrates an exemplary device in accordance with the present invention.

FIG. 1 shows an exemplary device for spatially locating, tracking and registering an object. The device includes a camera array 1 that comprises two cameras 2, such as hybrid cameras, for example, which can take recordings in both the visible light range and the infrared range. Instead of hybrid cameras 2, it is also possible to use cameras 2 that operate only in the visible light range. FIG. 1 also shows the body 5 of a patient on which a reference star 3 is arranged. The reference star 3 includes markers 4, such as passive, reflecting markers. An instrument 8, which also includes a reference star 3 comprising markers 4, can be used, for example, to examine the body 5.

The body 5 and the instrument 8 are preferably situated within the recording range of both cameras 2, such that the body 5 and the instrument 8 can be recorded from various positions. By means of recordings taken from different positions, a registration process can be performed with respect to a common coordinate system, such as the coordinate system of the camera array 1, for example. Using the same camera array 1 or the cameras 2, it is possible to detect and track the spatial position of the instrument 8 and the body 5. For example, the spatial position can be detected and tracked by first determining the initial position of the instrument 8 and the body 5 by means of a calibration process. Further, the cameras 2 can detect the location of the reference stars 3 of the instrument 8 and of the body 5 and, therefore, movements of the instrument 8 and/or the body 5 can be deduced from changes in the position of the reference stars. Thus, by means of the same camera array 1 or the cameras 2 attached to the same camera array 1, a registration process of the instrument 8 and/or the body 5 can be performed. The registration process can be performed with respect to a common coordinate system, such as the coordinate system of the camera array 1, by detecting the instrument 8 and the body 5 in the visible light range using the cameras 2, and assigning the captured data to spatial positions, in particular positions with respect to the common coordinate system. A tracking process of the instrument 8 and/or the body 5 also can be performed using the same camera array 1. For example, by detecting the reference stars 3 of the instrument 8 and/or the body 5 (which reflect infrared radiation emitted by the cameras 2 or emit infrared radiation themselves) via the cameras 2, and tracking the changes in position of the reference stars, the position of the instrument 8 and/or body 5 can be ascertained.

Figure 2:
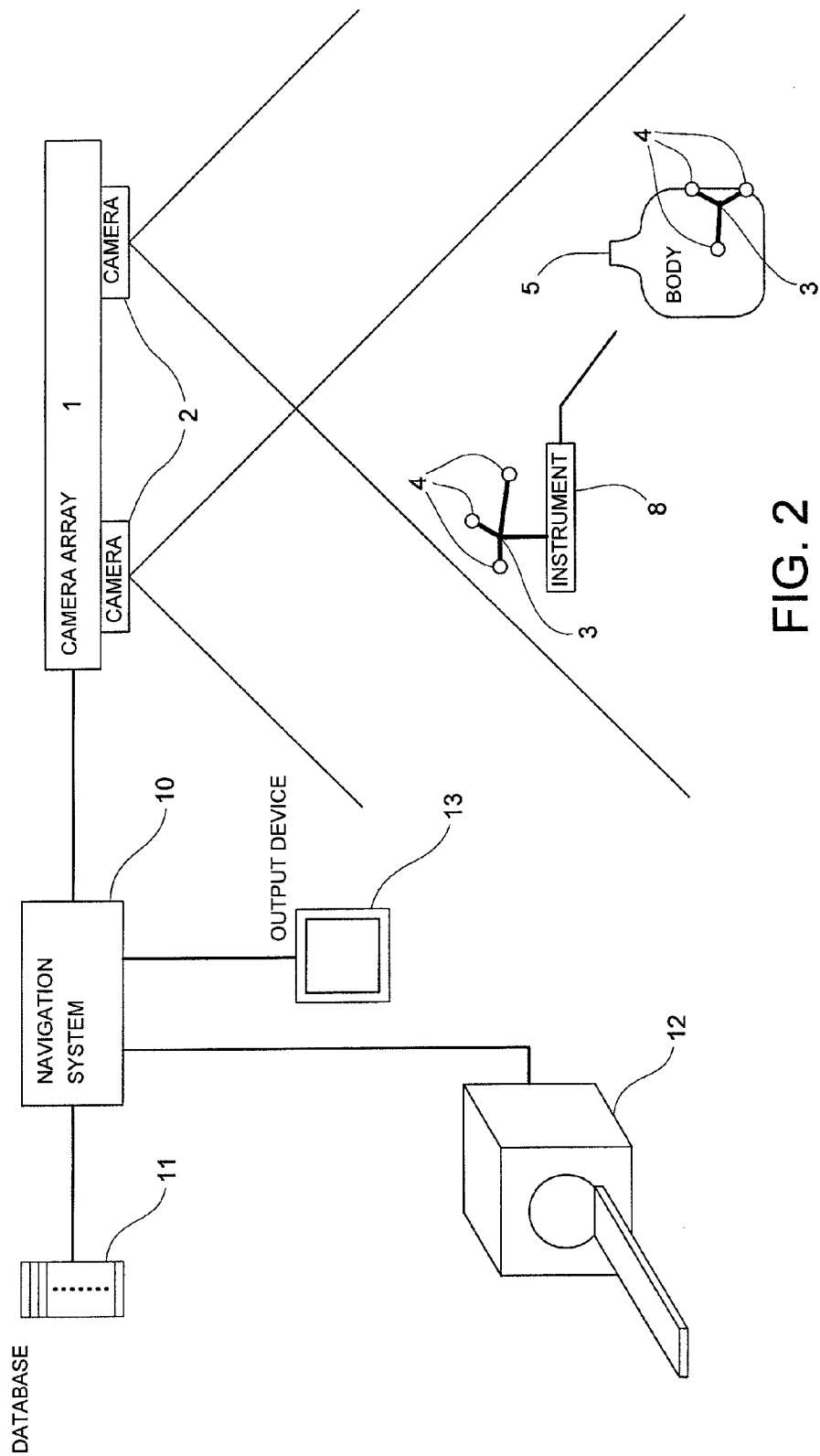
FIG. 2 illustrates another exemplary device in accordance with the present invention.

FIG. 2 shows another exemplary device that includes a camera array 1 to which two cameras 2 are attached, wherein the camera array 1 is connected via a wireless or wired connection to a navigation system 10, such as a computer, for example. The data captured by the cameras 2 (e.g., data for tracking or registering the instrument 8 and/or the body 5) can be transmitted from the camera array 1 to the navigation system 10. The navigation system 10, for example, can evaluate and reprocess the data, store the data in a database 11 and/or output the data via an output device 13, such as a screen, for example. Data relating to a body or an instrument, such as the body 5 or the instrument 8, also can be captured using a data input device 12, which in the exemplary device of FIG. 2 is a computer tomograph. The captured data can be transmitted to the navigation system 10, which can use the captured data together with the data captured by the cameras 2 for a registration process. The navigation system also can store the data captured by the data input device 12 in the database 11, for example, such that the data is stored as reference data and can be read by the navigation system 10.

Figure 3:
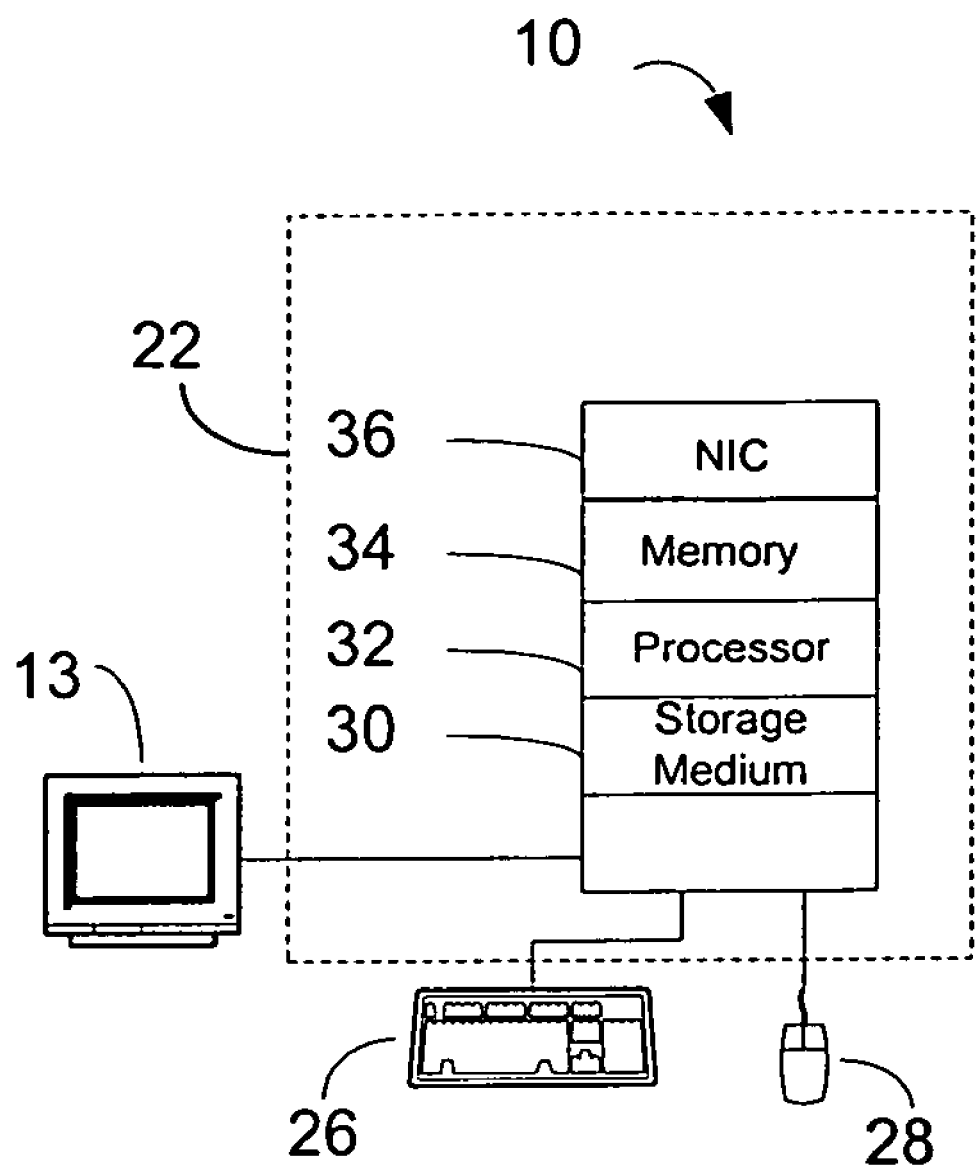
FIG. 3 is a block diagram of an exemplary computer system that can be used to implement the method of the present invention.

Moving to FIG. 3, an exemplary computer or navigation system 10 for executing a computer program in accordance with the present invention is illustrated. The computer 10 can be communicatively coupled to the cameras to receive positional data therefrom, and to display three-dimensional positional data. The computer 10 includes a computational unit 22 for processing data, and a display 13, such as a CRT, LCD, or the like, for viewing system information. A keyboard 26 and pointing device 28 may be used for data entry, data display, screen navigation, etc. The keyboard 26 and pointing device 28 may be separate from the computational unit 22 or they may be integral to it. A computer mouse or other device that points to or otherwise identifies a location, action, etc., e.g., by a point and click method or some other method, are examples of a pointing device. Alternatively, a touch screen (not shown) may be used in place of the keyboard 26 and pointing device 28. A touch screen is well known by those skilled in the art and will not be described in herein.

Included in the computational unit 22 is a storage medium 30 for storing information, such as application data, screen information, programs, etc. The storage medium 30 may be a hard drive, for example. A processor 32, such as an AMD Athlon 64™ processor or an Intel Pentium IV® processor, combined with a memory 34 and the storage medium 30 execute programs to perform various functions, such as data entry, numerical calculations, screen display, system setup, etc. A network interface card (NIC) 36 allows the computational unit 22 to communicate with devices external to the computer 10.

The actual code for performing the functions described herein can be readily programmed by a person having ordinary skill in the art of computer programming in any of a number of conventional programming languages based on the disclosure herein. Consequently, further detail as to the particular code itself has been omitted for sake of brevity.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A tracking and registration method for spatially locating and tracking an object using a camera array having at least two cameras, and for registering a spatial position of the object with an acquired, stored data set containing image data related to surface portions of the object, comprising:

monitoring, via the camera array, a spatial position of trackable markers attached to the object for movement with the object, whereby the spatial position of the object corresponds to the spatial position of said markers;

producing video recordings of a surface of the object via the camera array;

identifying surface portions of the object in the video recordings and correlating, with computer assistance, the identified surface portions with corresponding surface portions in the stored data set; and based on the spatial position of the trackable markers and the correlation of surface portions of the object with corresponding surface portions in the stored data set, registering the spatial position of the identified surface portions of the object with corresponding surface portions of the data set.

2. The method as set forth in claim 1, wherein the object is a medical instrument, a patient, or a patient body part, and the data set is a patient data set.

3. The method as set forth in claim 1, further comprising using points, point sets, tuples of points or contours of the surface as identified surface portions.

4. The method as set forth in claim 1, wherein correlating includes correlating the stored data set with the surface portions using a computer-assisted matching method.

5. The method as set forth in claim 1, wherein correlating includes correlating the stored data set with the surface portions using a photo consistency method.

6. The method as set forth in claim 1, wherein correlating includes correlating the stored data set with the surface portions using a point correlation method.

7. The method as set forth in claim 1, wherein identifying includes using a computer-assisted morphing method to assist in identifying the surface portions.

8. The method as set forth in claim 1, wherein identifying and correlating with computer assistance includes using a medical navigation system to which the camera array is assigned.

9. The method as set forth in claim 1, wherein monitoring via the camera array includes using cameras that produce video recordings in the visible light range, said recordings being used for tracking and/or locating the object and for registering the spatial positions of the object with the data set.

10. The method as set forth in claim 1, wherein monitoring via the camera array includes using cameras that produce recordings in the infrared light range for tracking and/or locating, and produce recordings in the visible light range for registering the spatial positions of the object with the data set.

11. A non-transitory computer readable medium comprising computer executable instructions adapted to perform the method according to claim 1.

12. A device for spatially locating and tracking an object, comprising:

a camera array comprising at least two cameras, wherein the camera array is configured to monitor a spatial position of trackable markers attached to the object, said camera array also configured to produce video recordings of a surface of the object, wherein surface portions of the object, with computer assistance are identified and correlated with corresponding surface portions in a stored data set containing image data related to surface portions of the object, and based on the spatial position of the trackable markers and the correlation of surface portions of the object with corresponding surface portions in the stored data set, register the spatial position of surface portions of the object with corresponding surface portions of the data set.

13. The device as set forth in claim 12, wherein the at least two cameras are configured as video cameras for video recording in the visible light range.

14. The device as set forth in claim 12, wherein the at least two cameras are configured as hybrid cameras for video recording in the visible light range and in the infrared range.

15. The device as set forth in claim 12, wherein the camera array is configured to be fixed or movable.

16. The device as set forth in claim 12, wherein the device further comprises a data output device to output the stored data set and/or the object, and a data input device comprising at least one of a keyboard, an x-ray device, an ultrasound tomograph, a computer tomograph, a magnetic resonance tomograph, a positron emission tomograph (PET) or a single photon emission tomography tomograph (SPECT), wherein the data input device can obtain data regarding the object.

17. The device as set forth in claim 16, wherein the data output device is a monitor.

18. The device as set forth in claim 16, wherein the device further comprises a database in which the characteristic data sets can be stored as reference data sets or into which data sets can be read and stored as reference data sets by the data input device.

19. The device as set forth in claim 12, wherein the object is an instrument.

20. The device of claim 19, wherein the instrument is a microscope or an endoscope.

* * * * *